United States Patent
Sliech (10) Patent No.: US 10,719,110 B2
(45) Date of Patent: Jul. 21, 2020

(54) IN-SYSTEM POWER USAGE MEASUREMENT

(71) Applicant: Apple Inc., Cupertino, CA (US)

(72) Inventor: Kevin W. Sliech, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 231 days.

(21) Appl. No.: 15/826,314

(22) Filed: Nov. 29, 2017

(65) Prior Publication Data
US 2019/0050035 A1    Feb. 14, 2019

Related U.S. Application Data

(60) Provisional application No. 62/543,214, filed on Aug. 9, 2017.

(51) Int. Cl.
*G06F 1/26*      (2006.01)
(52) U.S. Cl.
CPC ....................... *G06F 1/26* (2013.01)
(58) Field of Classification Search
CPC ...... G06F 1/26; G06F 3/0625; G06F 17/5036; H01C 13/02
See application file for complete search history.

(56) References Cited

U.S. PATENT DOCUMENTS

| | | | | |
|---|---|---|---|---|
| 7,454,724 | B2 * | 11/2008 | Kurihara | G06F 17/5036 703/1 |
| 9,076,577 | B2 * | 7/2015 | Roth | H01C 13/02 |
| 9,300,212 | B2 * | 3/2016 | Notman | H02M 3/1588 |
| 9,830,993 | B2 * | 11/2017 | Kong | G06F 3/0625 |
| 10,126,766 | B2 * | 11/2018 | Cho | G05F 1/56 |

* cited by examiner

*Primary Examiner* — Mohamed Charioui
(74) *Attorney, Agent, or Firm* — Fletcher Yoder P.C.

(57) ABSTRACT

Systems and methods are provided for performing an in-system measurement of power consumption without exclusive use of an in-line current-sense resistor. Indeed, these systems and methods may take advantage of existing parasitic resistances in an electronic device—such as resistances that might vary over time and under different operating conditions. To perform an in-system measurement, a digital value of a first voltage caused by an unknown amount of current flowing into a power-consuming component over an unknown resistance may be measured. Before or afterward, a current source may be activated to add or subtract a known amount of current to the unknown amount of current, resulting in a second voltage over the unknown resistance, and a digital value of the second voltage over the unknown resistance may be measured. The power consumption by the power-consuming component can then be calculated from these values.

21 Claims, 9 Drawing Sheets

IN-SYSTEM POWER USAGE MEASUREMENT

CROSS REFERENCE TO RELATED APPLICATION

Under 35 U.S.C. § 120, this application is a Non-Provisional application claiming priority to U.S. Provisional Application No. 62/543,214, entitled "IN-SYSTEM POWER USAGE MEASUREMENT," filed Aug. 9, 2017, which is incorporated herein by reference in its entirety for all purposes.

BACKGROUND

This disclosure relates to measuring power consumption by a component of an electronic device without necessarily adding an always-on, power-consuming in-line current-sense resistor.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices have become ubiquitous features of the modern world. Computers, mobile phones, televisions, smart home devices, and cars represent some of these electronic devices. These electronic devices—namely, the various components of the electronic devices—consume power during operation. In one example, electronic displays may consume comparatively large amounts of power. Tracking and measuring how much power electronic displays or other components consume within an electronic device would be useful for debugging and/or monitoring overall power consumption.

Many methods for measuring the amount of power consumed by a component of an electronic device may have severe drawbacks. In one example, a current-sense resistor having a known resistance may be placed in series from a power supply of the electronic device to the component of the electronic device. A voltage may be measured across that resistor. Because the resistance of the current-sense resistor is known, the current through the resistor can subsequently be calculated. Multiplying the measured voltage by the calculated current gives the value of the amount of power consumed by the component. An in-line current-sense resistor, however, constantly dissipates additional power in the form of heat any time the component of the electronic device is consuming power, regardless of whether power is currently being measured. Losing additional power and increasing the amount of ambient heat, however, are undesirable in an electronic device.

BRIEF DESCRIPTION OF THE DRAWINGS

Various aspects of this disclosure may be better understood upon reading the following detailed description and upon reference to the drawings in which.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An efficient method for measuring the power usage of a target load within an electronic device—not only during prototyping and development stages, but also in commercial or mass production—may provide immense value. Such an in-system power measurement may be used to more accurately how power is consumed by various components of an electronic device in real-world use. This could provide valuable feedback to improve power efficiency as well as provide more accurate estimates of battery life. In another example, a specific component may be determined to be malfunctioning if an uncharacteristically high amount of power is measured.

In this disclosure, an in-system power measurement system is described, which may efficiently obtain power measurements without exclusively using an in-line current-sense resistor. As mentioned above, an in-line current-sense resistor for measuring power consumption by a particular electronic component will dissipate some power as heat any time the electronic component is consuming power. Thus, over the lifetime of the electronic device, such an in-line current-sense resistor could, on its own, consume a significant amount of power. This is especially true when considering the total number of electronic devices that would have a widely deployed current-sense resistor if included in the electronic devices in mass production.

Rather than exclusively use an in-line, always-on current-sense resistor, the systems and methods of this disclosure may measure power consumption using a switchable current source that can be turned off when not in use for measuring power consumption based on resistances that may already be present in an electronic device (though an additional current-sense resistor, of possibly lower resistance, may be added if desired). The switchable current source may draw a known (defined) or calculable amount of current. By measuring a first voltage difference over a resistance when the switchable current source is off and by measuring a second voltage difference over the resistance when the switchable current source is on, an estimate of power may be calculated. Moreover, the resistance over which the first and second voltages are measured may or may not be additional resistances of some well-known value. Indeed, resistances that are already in the electronic device (e.g., a parasitic resistance) may also be used for measuring the voltage differences, even if these resistances vary depending on current operating conditions like temperature.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Within electronic devices, certain electronic components may consume variable amounts of power during operation. Monitoring the different levels of power usage of electronic components of the electronic devices may facilitate the debugging and design of the electronic devices. Rather than exclusively use an in-line, always-on current-sense resistor, the systems and methods of this disclosure may measure power consumption using a switchable current source that can be turned off when not in use for measuring power consumption.

Figure 1:
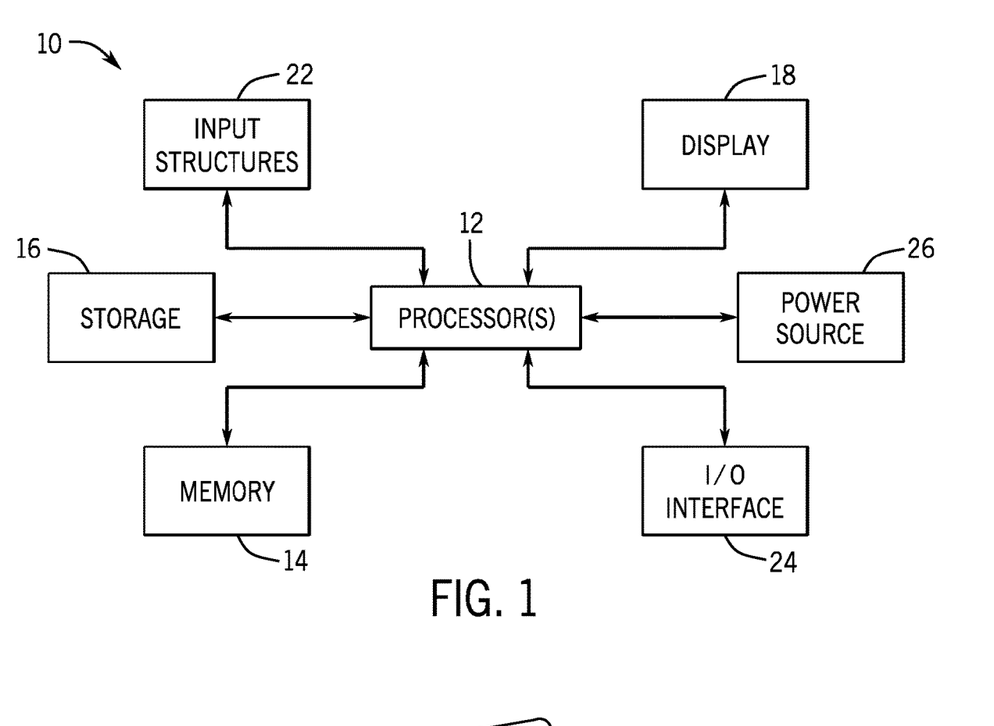
FIG. 1 is a schematic block diagram of an electronic device, in accordance with an embodiment.

With this in mind, FIG. 1 represents an electronic device 10 that may employ such in-system power-measurement systems and methods. The electronic device 10 may include, among other things, one or more processor(s) 12, memory 14, nonvolatile storage 16, a display 18 input structures 22, an input/output (I/O) interface 24 and a power source 26. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in the electronic device 10.

Figure 2:
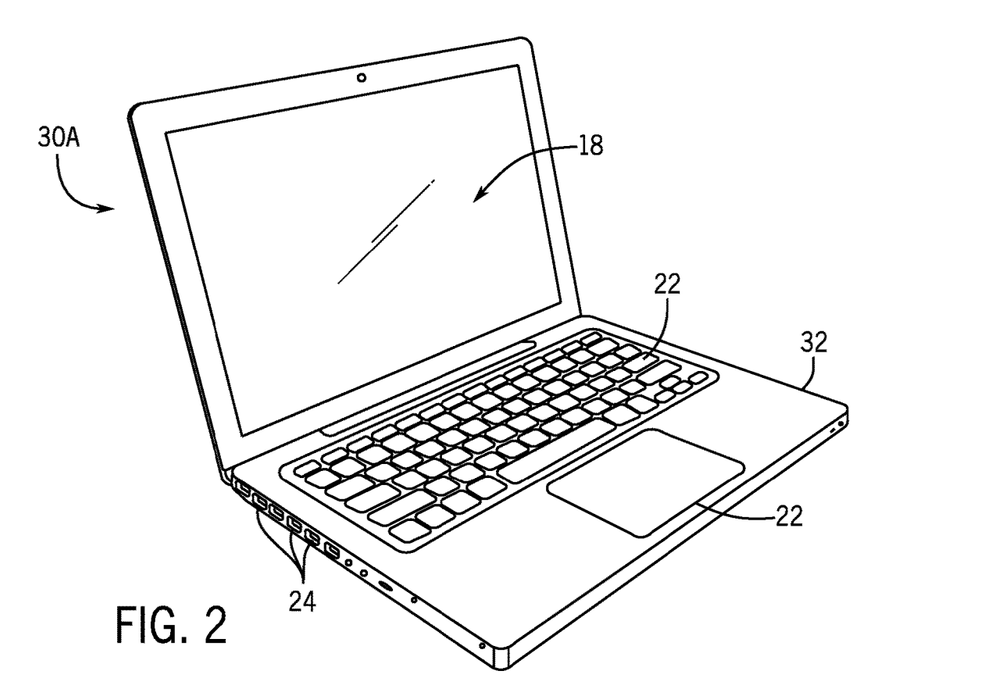
FIG. 2 is a perspective view of a notebook computer representing an embodiment of the electronic device of FIG. 1, in accordance with an embodiment.
Figure 3:
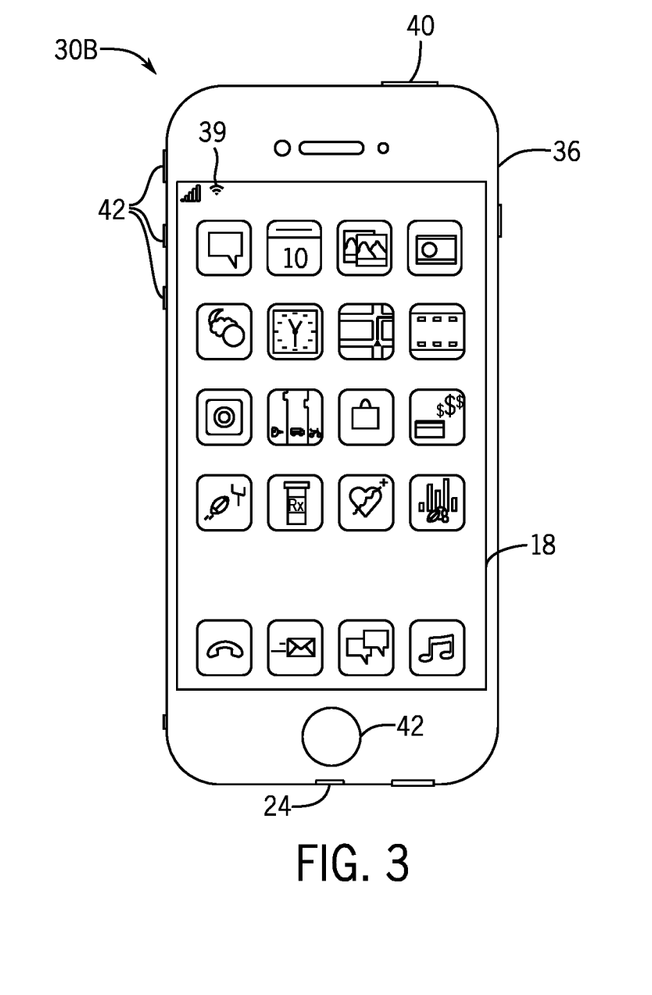
FIG. 3 is a front view of a hand-held device representing another embodiment of the electronic device of FIG. 1, in accordance with an embodiment.
Figure 4:
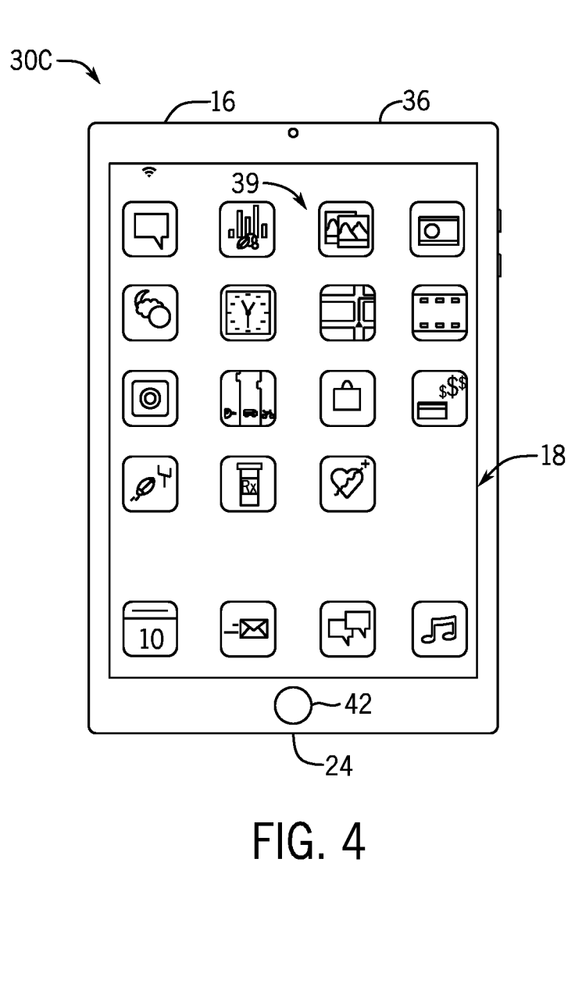
FIG. 4 is a front view of another hand-held device representing another embodiment of the electronic device of FIG. 1, in accordance with an embodiment.
Figure 5:
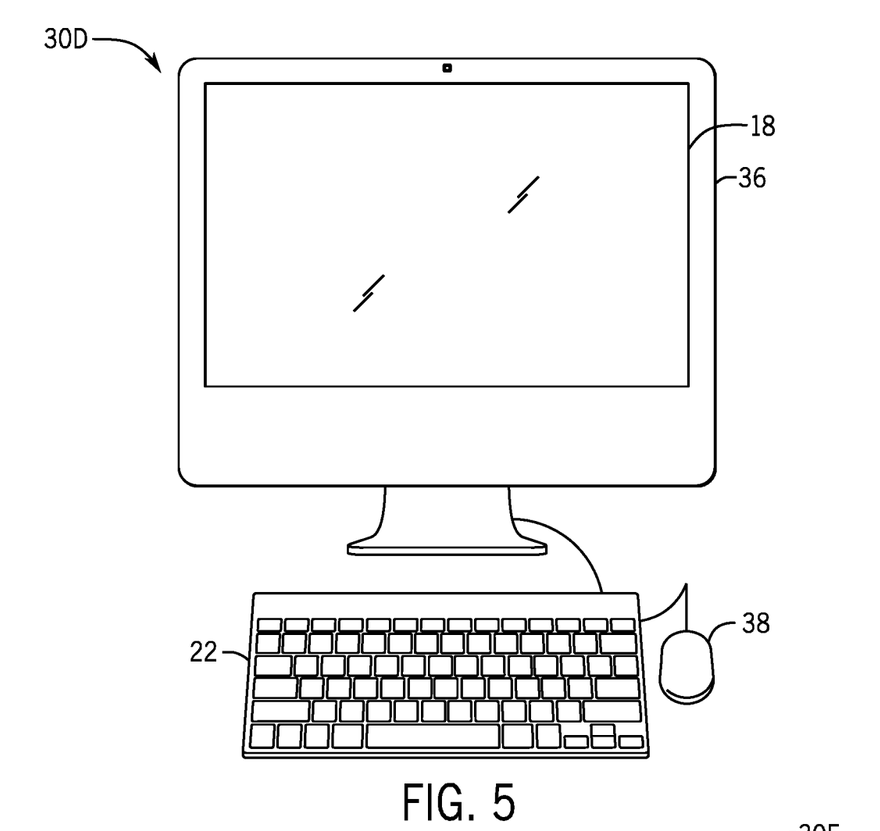
FIG. 5 is a front view of a desktop computer representing another embodiment of the electronic device of FIG. 1, in accordance with an embodiment.
Figure 6:
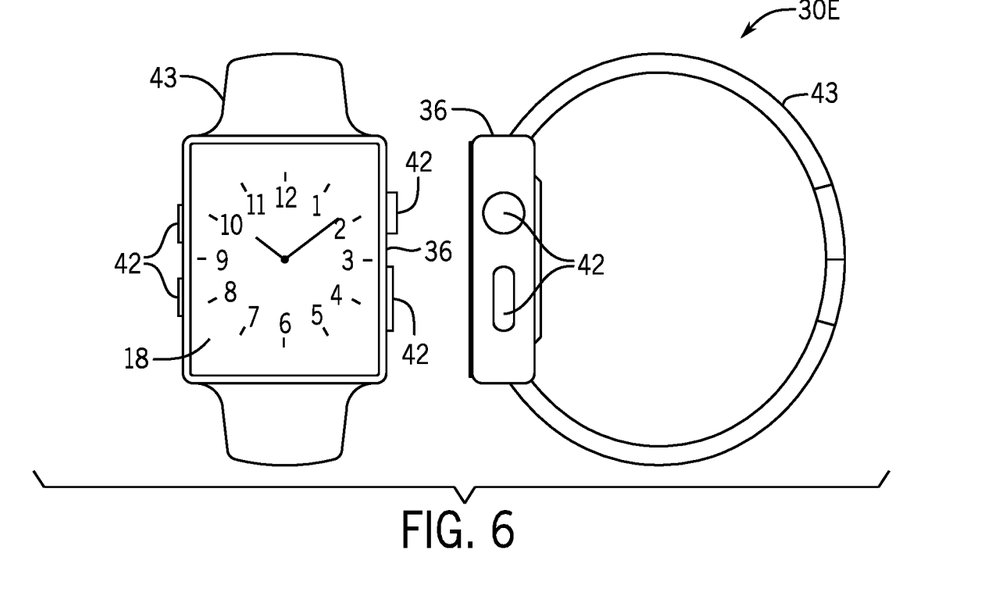
FIG. 6 is a front view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile storage 16 to perform various algorithms. Such programs or instructions, including those for carrying out the techniques described herein, may be executed by the processor(s) 12 or other data processing circuitry and may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., e.g., an operating system) encoded on such a computer program product may also include instructions that may be executed by the processor(s) 12 to enable the electronic device 10 to provide various specific functionalities.

In certain embodiments, the display 18 may be a liquid crystal display (e.g., LCD) or an organic light emitting diode (OLED) display, which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more light emitting diode (e.g., µLED or OLED) displays, or some combination of LCD panels and LED panels.

The input structures 22 of the electronic device 10 may enable a user to interact with the electronic device 10 (e.g., e.g., pressing a button to increase or decrease a volume level). The I/O interface 24 may enable electronic device 10 to interface with various other electronic devices. The I/O interface 24 may include various types of ports that may be connected to cabling. These ports may include standardized and/or proprietary ports, such as USB, RS232, Apple's Lightning® connector, as well as one or more ports for a conducted RF link. The I/O interface 24 may also include, for example, interfaces for a personal area network (e.g., PAN), such as a Bluetooth network, for a local area network (e.g., LAN) or wireless local area network (e.g., WLAN), such as an 802.11x Wi-Fi network, and/or for a wide area network (e.g., WAN), such as a 3rd generation (e.g., 3G) cellular network, 4th generation (e.g., 4G) cellular network, or long term evolution (e.g., LTE) cellular network. The I/O interface 24 may also include interfaces for, for example, broadband fixed wireless access networks (e.g., WiMAX), mobile broadband Wireless networks (e.g., mobile WiMAX), and so forth.

As further illustrated, the electronic device 10 may include a power source 26. The power source 26 may include any suitable source of power, such as a rechargeable lithium polymer (e.g., Li-poly) battery and/or an alternating current (e.g., AC) power converter. The power source 26 may be removable, such as replaceable battery cell.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted notebook computer 30A may include housing or enclosure 32, a display 18, input structures 22, and ports of the I/O interface 24. In one embodiment, the input structures 22 (e.g., such as a keyboard and/or touchpad) may be used to interact with the notebook computer 30A, such as to start, control, or operate a GUI or applications running on notebook computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif.

The handheld device 30B may include an enclosure 36 to protect interior components from physical damage and to shield them from electromagnetic interference. The enclosure 36 may surround the display 18, which may display indicator icons 39. The indicator icons 39 may indicate, among other things, a cellular signal strength, Bluetooth connection, and/or battery life. The I/O interfaces 24 may open through the enclosure 36 and may include, for example, an I/O port for a hard wired connection for charging and/or content manipulation using a connector and protocol, such as the Lightning connector provided by Apple Inc., a universal serial bus (e.g., USB), one or more conducted RF connectors, or other connectors and protocols.

Input structures 40 and 42, in combination with the display 18, may allow a user to control the handheld device 30B. For example, the input structure 40 may activate or deactivate the handheld device 30B, one of the input structures 42 may navigate user interface to a home screen, a user-configurable application screen, and/or activate a voice-recognition feature of the handheld device 30B, while other of the input structures 42 may provide volume control, or may toggle between vibrate and ring modes. The input structures 42 may also include a microphone may obtain a user's voice for various voice-related features, and a speaker to allow for audio playback and/or certain phone capabilities. The input structures 42 may also include a headphone input to provide a connection to external speakers and/or headphones.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (e.g., PC) by another manufacturer. A similar enclosure 36 may be provided to protect and enclose internal components of the computer 30D such as the dual-layer display 18. In certain embodiments, a user of the computer 30D may interact with the computer 30D using various peripheral input devices, such as input structures 22, which may connect to the computer 30D via a wired and/or wireless I/O interface 24.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 43, may be an Apple Watch® by Apple, Inc. However, in other embodiments, the wearable electronic device 30E may include any wearable electronic device such as, for example, a wearable exercise monitoring device (e.g., e.g., pedometer, accelerometer, heart rate monitor), or other device by another manufacturer. The display 18 of the wearable electronic device 30E may include a touch screen (e.g., e.g., LCD, OLED display, active-matrix organic light emitting diode (e.g., AMOLED) display, and so forth), which may allow users to interact with a user interface of the wearable electronic device 30E.

Any of the devices 30 described above may store one or more multi-frame assets on the memory 14 and/or nonvolatile storage 16, for example, or on the cloud that may be accessed via the I/O interface 24. The techniques described below may be used to convert or compress a selected multi-frame asset into a single image for humorous or artistic purposes, for example. These techniques may be embodied in any suitable combination of hardware, firmware, and/or software which may be stored and executed on the devices 30, using the processor(s) 12, memory 14, and/or nonvolatile storage 16, for example. Furthermore, these techniques may be used on any multi-frame asset such as video, time-lapse photography, panoramic images, fast-burst images, etc.

Figure 7:
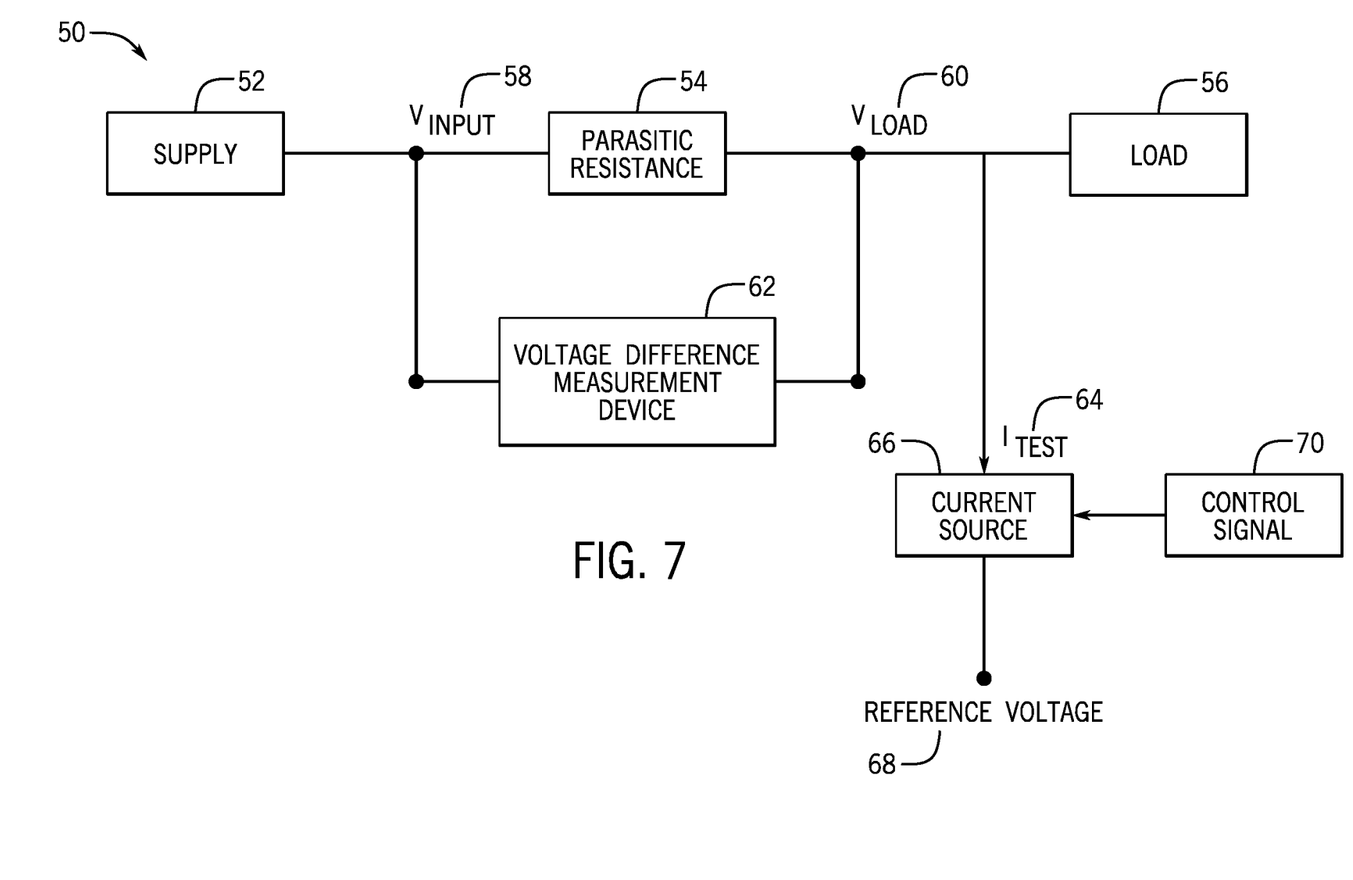
FIG. 7 is a schematic block diagram of circuitry for an in-system power measurement of a component of an electronic device, in accordance with an embodiment.

FIG. 7 is a block diagram of a circuit 50 with the electronic device 10 that may include a power supply 52, a parasitic resistance 54, and a load 56. The power supply 52 supplies power to the circuit 50. The power for the power supply 52 may originate from the power source 26. The power supply 52 may, for example, be a power management integrated circuit (PMIC) and/or a battery. The power from the power supply 52 creates an input voltage 58 (VINPUT) at the connection, or node, between the power supply 52 and the parasitic resistance 54 of the circuit 50. The parasitic resistance 54 represents the variety of unwanted resistances that may exist within the circuit 50 between the power supply 52 and the load 56. The parasitic resistance 54 introduces power loss into the circuit 50.

The load 56 represents an electronic component of the electronic device to which the power supply 52 may be supplying power. In other words, the load 56 consumes power that the power supply 52 provides to the circuit 50. A load voltage 60 ($V_{LOAD}$), which can be measured, forms at the node between the load 56 and the parasitic resistance 54.

A voltage difference measurement device 62 (e.g., analog-to-digital converter) may measure voltage differences that can be used to calculate the power usage of the load 56. The voltage difference measurement device 62 measures the difference between the input voltage 58 and the load voltage 60 and communicates this to the electronic device 10. The voltage difference measurement device 62 may connect to the input voltage 58 and the load voltage 60 in order to determine the difference in voltage across the parasitic resistance 54. Measuring the difference in voltage across the parasitic resistance 54 only once, however, may not provide enough information to calculate the power usage of the load 56.

As such, the difference in voltage across the parasitic resistance 54 may be measured in conjunction with a test current 64 from a current source 66. The current source 66 may be any one of a variety of devices that produces in an appropriately precise current through the connection from the load 56 node to a reference voltage 68 (e.g., a known resistor and a switch, a current mirror and a switch, and so forth). The application of the load 56 may determine the appropriately precise current for the electronic device 10 and what specific device to use for the current source 66. Regardless of application specification for the current source 66, a control signal 70 may enable or disable the current source 66.

When the current source 66 is enabled by the control signal 70, the test current 64 transmits from the load 56 node to the reference voltage 68. The test current 64 results from the voltage difference between the load voltage 60 and the reference voltage 68. The most appropriate voltage for the reference voltage 68 may depend on the application of the circuit 50. The test current 64 may exist with or without the voltage difference measurement device 62 connected to the same node between the parasitic resistance 54 and the load 56.

Any suitable data processing circuitry of the electronic device 10 may calculate the test current 64 by dividing the difference between the load voltage 60 measured and the reference voltage 68 by the known resistance of the current source 66. The voltage difference between the input voltage 58 and the load voltage 60 combined with the value of the test current 64 from the current source 66 lead to the calculation of the power usage of the load 56. A power usage calculation method 80 is described further in FIG. 8.

Figure 8:
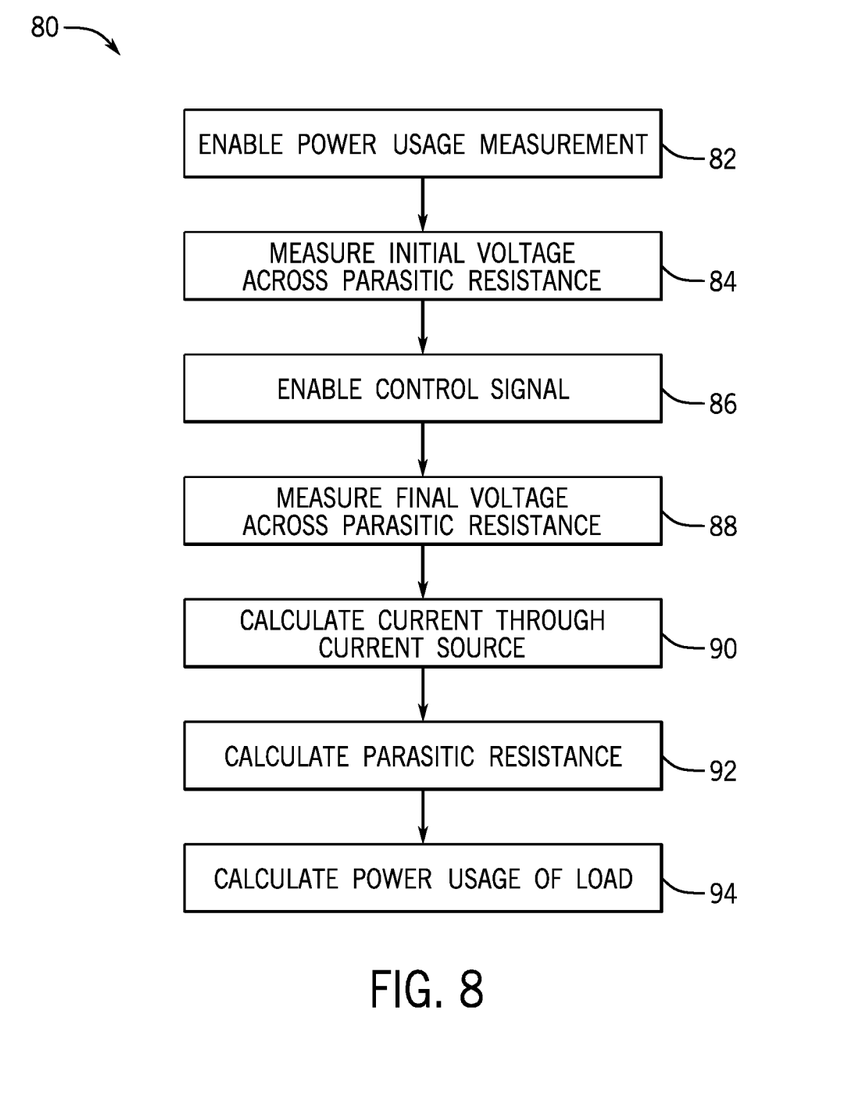
FIG. 8 is a flowchart of a method for measuring power usage of a component of an electronic device, in accordance with an embodiment.

The power usage calculation method 80 in FIG. 8 includes the enabling of the power usage measurement function (process block 82), measuring the initial voltage difference across the parasitic resistance (process block 84), enabling the control signal (process block 86), measuring the voltage across the parasitic resistance (process block 88), calculating the test current through the current source (process block 90), calculating the parasitic resistance (process block 92), and calculating the power usage of the electric load (process block 94).

To elaborate, once enabled, in an embodiment, the voltage difference measurement device 62 may perform the initial voltage difference measurement. The voltage difference measurement device 62 may perform the initial voltage difference measurement by measuring the difference between the input voltage 58 and the load voltage 60 on either connecting ends of the parasitic resistance 54 (process block 84). The initial voltage difference measurement may be expressed as follows:

$$\Delta V_{INITIAL} = V_{INPUT.INITIAL} - V_{LOAD.INITIAL} \qquad \text{EQ. 1}$$

The initial voltage difference measurement may be taken before enabling the control signal 70 or after disabling the control signal 70. The initial voltage difference measurement acts as a calibration that may protect against variances within the circuit 50 affecting measurement accuracy. The initial measurement acts to mathematically reset the voltage baseline before the control signal is enabled. This measurement baseline may be taken before each power calculation to compensate for variation in the components of the circuit 50 (e.g., variations resulting from changes in process, voltage, and/or temperature) and/or may be taken during manufacturing in a controlled environment. Resetting the baseline of the voltage comparison by taking the initial voltage difference measurement allows for any variations in the components to be inherent to the baseline each time a new power usage measurement is made. Once the voltage difference measurement device 62 makes the initial voltage difference measurement (process block 84), the control signal 70 may enable (process block 86).

When the control signal 70 enables (process block 86), the current source 66 is activated to cause the test current 64 through the current source 66. The addition of the test current 64 to the circuit 50 may cause the values of the input voltage 58 and the load voltage 60 to change. To accommodate the change, the power usage measurement may involve measuring an additional voltage difference across the parasitic resistance 54 (process block 88).

The voltage difference measurement device 62 may make the additional voltage difference measurement across the parasitic resistance (process block 88). The voltage difference measurement is taken after the current source 66 is enabled. The voltage difference measurement device 62 may perform the final voltage difference measurement by measuring the difference between the value of the input voltage 58 and the value of the load voltage 60. The final voltage difference measurement may be expressed as follows:

$$\Delta V_{FINAL} = V_{INPUT.FINAL} - V_{LOAD.FINAL} \qquad \text{EQ. 2}$$

Using a measurement of the final load voltage 60, the electronic device may calculate the test current 64 (process block 90). Following the physical relationship provided by Ohm's Law, the electronic device 10 may calculate the test current 64 by dividing the final load voltage 60 by the known resistance of the current source 66. The test current 64 calculation may be expressed as such:

$$I_{TEST} = \frac{V_{LOAD.FINAL}}{R_T} \qquad \text{EQ. 3}$$

To complete the power usage measurement, the electronic device 10 may calculate the parasitic resistance 54 (process block 92). The electronic device 10 may calculate the parasitic resistance 54 by dividing the difference between the initial voltage difference measurement and the voltage difference measurement by the test current 64. The parasitic resistance 54 calculation may be expressed as such:

$$R_{PARASITIC} = \frac{\Delta V_{INITIAL} - \Delta V_{FINAL}}{I_{TEST}} \qquad \text{EQ. 4}$$

To calculate the power usage of the load 56 (process block 94), divide the product of the final load voltage 60 and the difference between the between the initial voltage difference measurement and the final voltage difference measurement by the parasitic resistance 54 to calculate the power usage of the load 56. The power usage of the load 56 calculation may be expressed as such:

$$P_{LOAD} = \frac{V_{LOAD,INITIAL} * (\Delta V_{INITIAL})}{R_{PARASITIC}} \qquad \text{EQ. 5}$$

Figure 9:
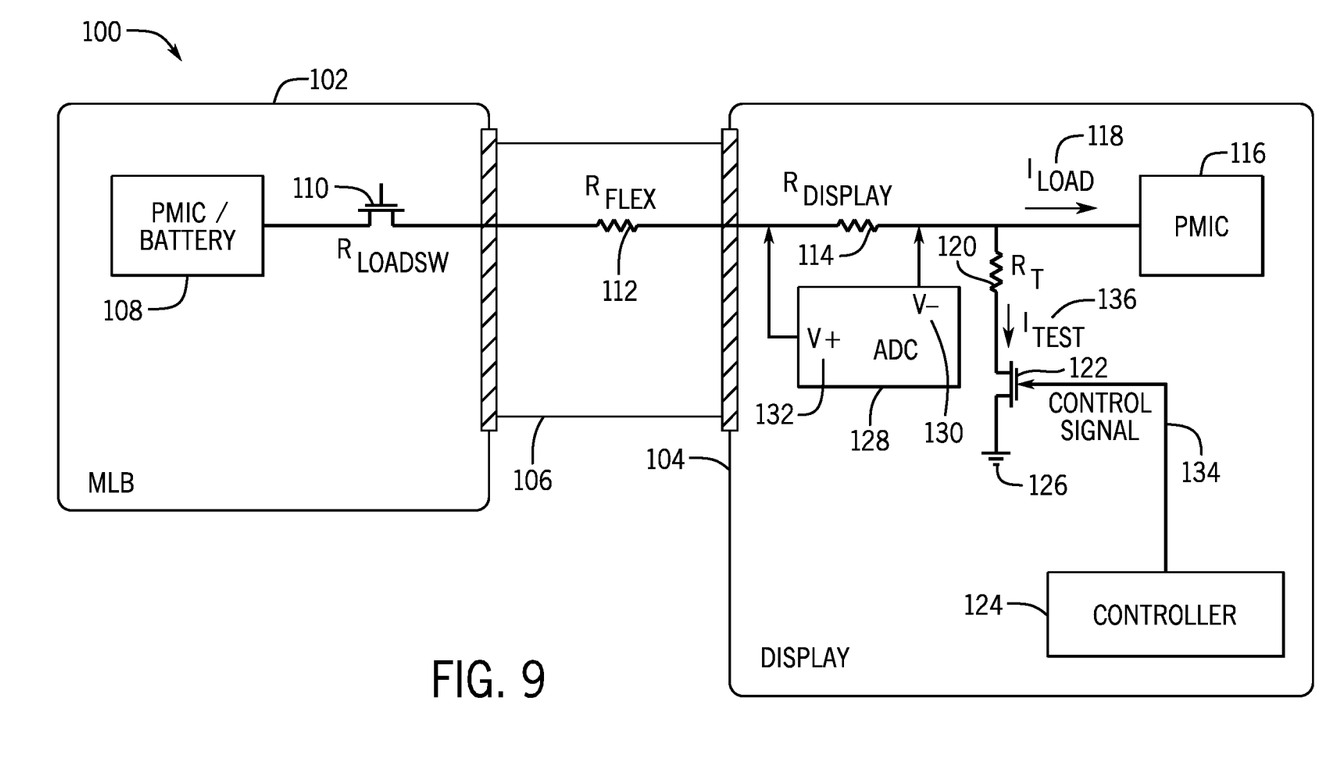
FIG. 9 is a block diagram of a system for measuring power consumed by an electronic display, in accordance with an embodiment.

Some applications may benefit from determining the power usage of the display 18 of the electronic device 10. FIG. 9 shows an example of an electronic display circuit 100 in which the power usage of the display 18 is measured.

FIG. 9 shows an electronic display circuit 100, which may include a main logic board (MLB) 102, a display 104, and a flexible connection 106. In this example, the MLB 102 connects to the display 104 through the flexible connection 106. The MLB 102 may include a first PMIC/battery 108 and a load switch 110. The first PMIC/battery 108 may act as the power supply 52 to the circuit. The first PMIC/battery 108 connects to the load switch 110. The load switch 110 acts to disconnect or connect the power supply 52 to the attached load 56. The load switch 110 may have a non-negligible internal resistance $R_{LOADSW}$, which introduces losses into the electronic display circuit 100. The MLB 102 may connect to the display 104 through the flexible connection 106. The flexible connection 106 has a flexible connection internal resistance 112 ($R_{FLEX}$) which also introduces losses into the electronic display circuit 100.

The display 104 may include a display internal resistance 114 ($R_{DISPLAY}$), a second PMIC 116, and a load current 118 ($I_{LOAD}$). The display 104 may have the display internal resistance 114. The display internal resistance 114 represents the total of the internal resistances to the display 104 (e.g., ferrite resistors, transmission line impedances). The second PMIC 116 may control the power usage of the display 104. In this embodiment, the load current 118 transmits from the first PMIC/battery 108 to the second PMIC 116. The load current 118 value may vary based on the power usage use of the second PMIC 116. The varied power usage of the second PMIC 116 may be based on how long and in what capacity the display 104 is used in. For this example, the power usage of the display 104 is of interest, so the components involved with the power usage calculation method 80 are placed in relation to the second PMIC 116 as to make such measurements within the electronic display circuit 100. Components involved with the power usage calculation method 80 include a test resistance 120, a switch 122, a controller 124 or other circuitry of the electronic device 10, a reference ground voltage 126, and an analog-to-digital converter 128.

To implement the power usage calculation method 80, the analog-to-digital converter 128 may make the initial voltage measurement across the parasitic resistance 54 (process block 84), assuming power usage measurement is enabled in the controller 124 or other circuitry of the electronic device 10 (process block 82). The specific application of the circuit 50 determines the appropriate value of the parasitic resistance 54. Different applications may involve different resistances to account for differences in operating voltages, so the parasitic resistance 54 may be sized appropriately for the application. In this embodiment, the display internal resistance 114 represents the parasitic resistance 54.

To make the initial voltage measurement across the parasitic resistance 54, the analog-to-digital converter 128 uses a negative input terminal 130 to connect to the node between the display internal resistance 114 and the second PMIC 116. A positive input terminal 132 on the analog-to-digital converter 128 connects on the opposite end of the display internal resistance 114. This connection allows for the analog-to-digital converter 128 to measure the initial voltage across the display internal resistance 114. The controller 124 or other circuitry of the electronic device 10 stores the measurement made by the analog-to-digital converter 128 for future calculation.

Once the controller 124 or other circuitry of the electronic device 10 stores the initial voltage measurement, the controller 124 or other circuitry of the electronic device 10 enables the switch 122 with a control signal 134. The closing of the switch 122 allows for a test current 136 ($I_{TEST}$) to transmit from the reference ground voltage 126 to the node between the display internal resistance 114 and the second PMIC 116. Once the switch 122 is closed and the complete connection is made, the analog-to-digital converter 128 may measure the voltage across the display internal resistance 114. The controller 124 or other circuitry of the electronic device 10 may store the voltage measurement made by the analog-to-digital converter 128. The controller 124 or other circuitry of the electronic device 10 may calculate the test current 136 by dividing the final load voltage measured by the negative input terminal 130 by the test resistance 120.

Once the controller 124 or other circuitry of the electronic device 10 calculates the test current 136, the controller 124 or other circuitry of the electronic device 10 may calculate the parasitic resistance 54 (process block 92) without directly measuring the value of the parasitic resistance 54. The controller 124 or other circuitry of the electronic device 10 may calculate the parasitic resistance 54 by dividing the difference between the initial voltage difference measurement and the voltage difference measurement by the test current 136. The calculated resistance is used to calculate the power usage of the power usage of the display 104 through measuring the power usage of the second PMIC 116 (process block 94). The controller 124 or other circuitry of the electronic device 10 may divide the product of the final load voltage 60 and the difference between the initial voltage difference measurement and the voltage difference measurement by the parasitic resistance 54 to calculate the power usage of the load 56.

Suppose the display internal resistance 114 were insufficient value of parasitic resistance 54 for the load current of the second PMIC 116. To solve this, an increased value of the parasitic resistance 54 may facilitate in making the proper power usage of the load measurement. Solving this problem by only physically adding an additional source of resistance would be inefficient, however, as it would result in additional loss to the electronic display circuit 100. Reconnecting the voltage difference measurement device 62 to include additional parasitic resistance 54 inherent to the electronic display circuit 100 may provide a better solution and one that relies less on additional sources of resistance. In other words, leveraging existing resistances within the circuit to increase the parasitic resistance 54 may solve the problem of insufficient value of the parasitic resistance 54 without adding additional losses to the electronic display circuit 100.

This is possible since the power usage calculation method 80 works independent of knowing the exact value of the parasitic resistance 54. Since the power usage calculation method 80 works independent of the exact value of the parasitic resistance 54, the parasitic resistance 54 may equate to a combination of available resistances within the electronic display circuit 100 as long as they are of sufficient rating for the application. Both FIG. 10 and FIG. 11 show variations to the parasitic resistance 54 that are used for in-system power measurements within the electronic display circuit 100.

Figure 10:
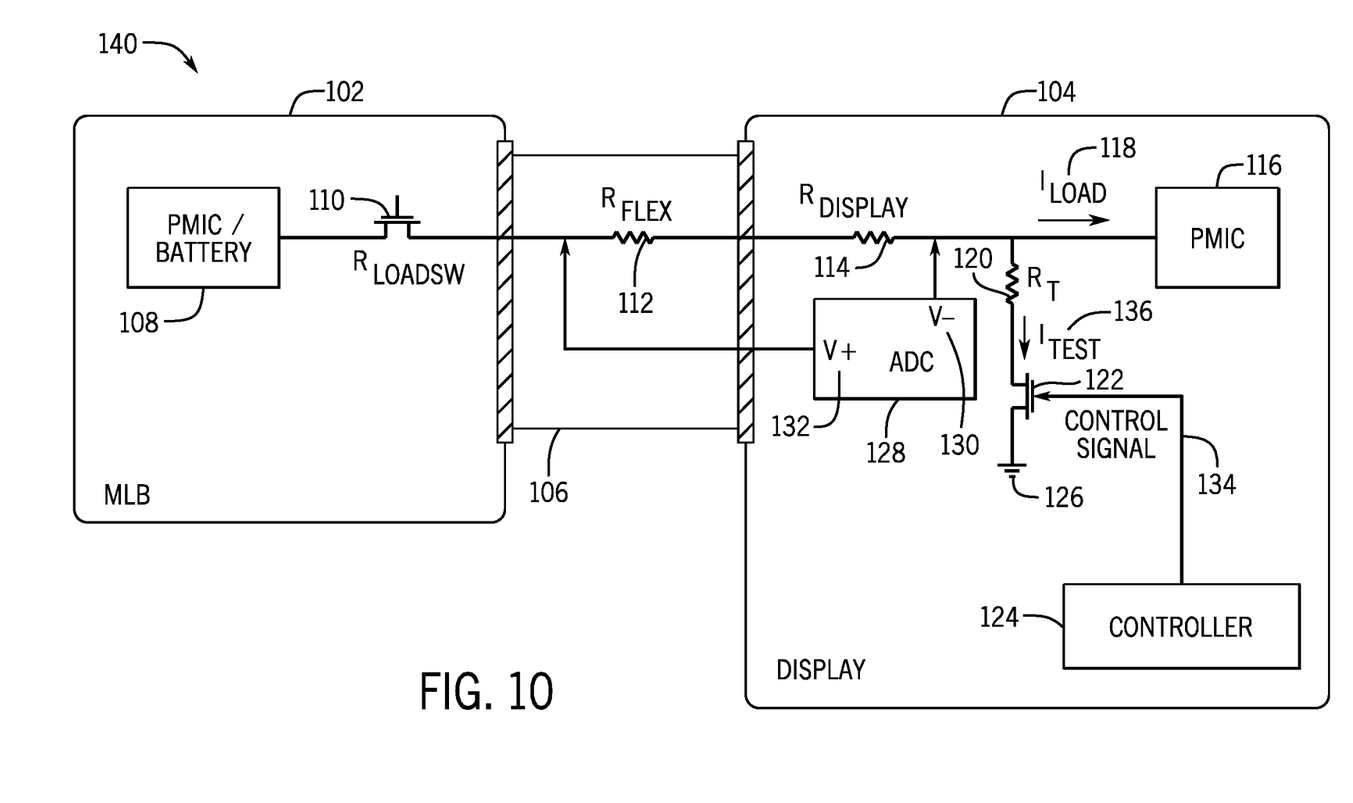
FIG. 10 is a block diagram of another system for measuring power consumed by an electronic display, in accordance with an embodiment.

FIG. 10 shows a second electronic display circuit 140 for measuring in-system power consumption with a different parasitic resistance 54. Here, the flexible connection internal resistance 112 internal to the flexible connection 106 may join the MLB 102 to the display 104 in the second electronic display circuit. This additional resistance may be used to increase the value of the parasitic resistance 54 (e.g., as may be valuable when a single source of resistance is not sufficient). To include the flexible connection internal resistance 112 with the display internal resistance 114 in the creation of the parasitic resistance 54, the positive input terminal 132 of the analog-to-digital converter 128 may intersect at the node between the load switch 110 and the flexible connection internal resistance 112. This change of connection point translates into the analog-to-digital converter 128 reading the voltage difference over both the flexible connection internal resistance 112 and the display internal resistance 114. The combination of the flexible connection internal resistance 112 and the display internal resistance 114 make the parasitic resistance 54 in this embodiment.

Figure 11:
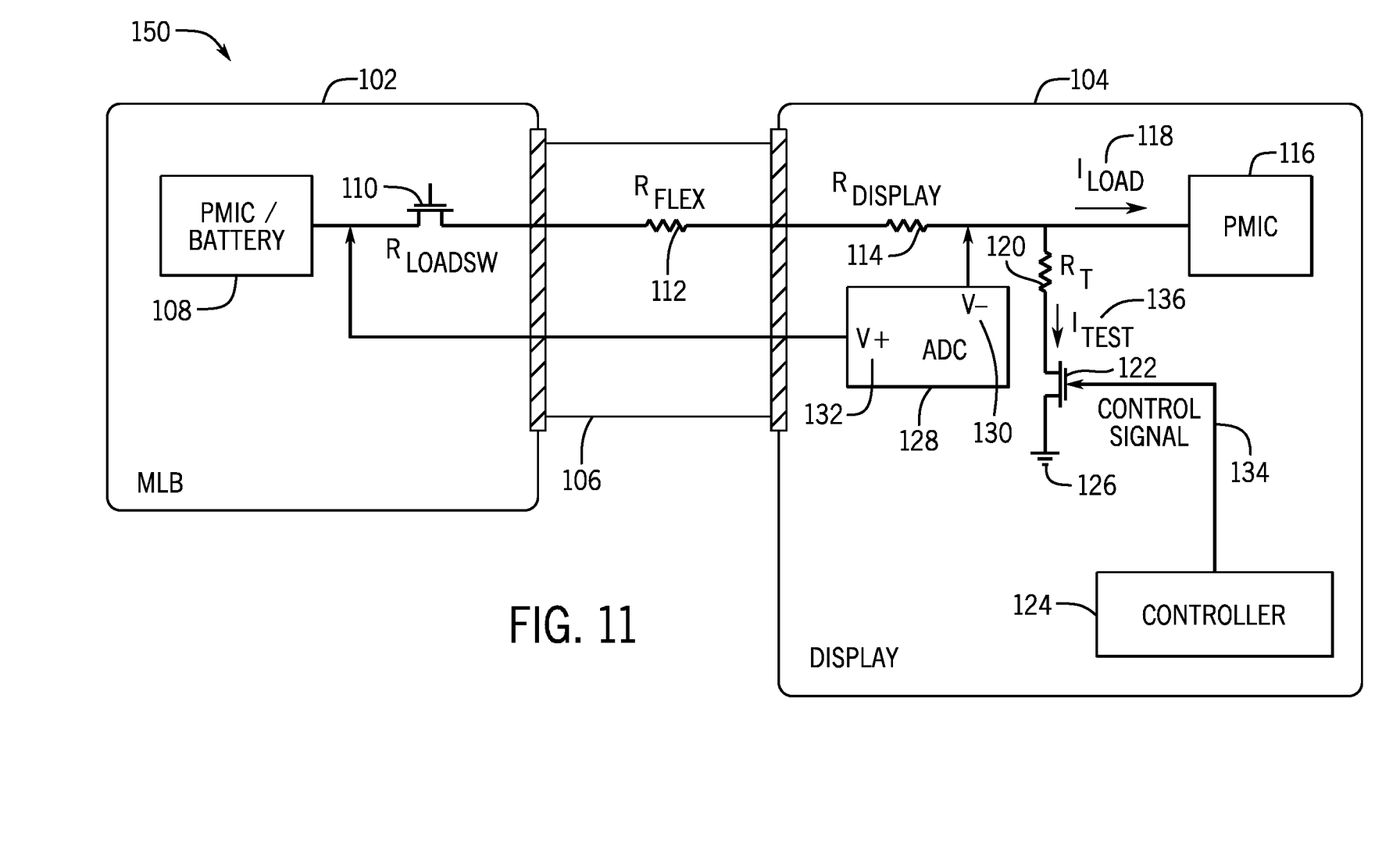
FIG. 11 is a block diagram of another system for measuring power consumed by an electronic display, in accordance with an embodiment.

FIG. 11 shows another example of circuitry for in-system power measurement via a third electronic display circuit 150. Here, the positive input terminal 132 of the analog-to-digital converter 128 connects at a node between the first PMIC/battery 108 and the load switch 110. This change of connection point translates into the analog-to-digital converter 128 reading the voltage difference over the internal resistance of the load switch 110, the flexible connection internal resistance 112, and the display internal resistance 114. The combination of the internal resistance of the load switch 110, the flexible connection internal resistance 112, and the display internal resistance 114 make the parasitic resistance 54 in this embodiment.

Figure 12:
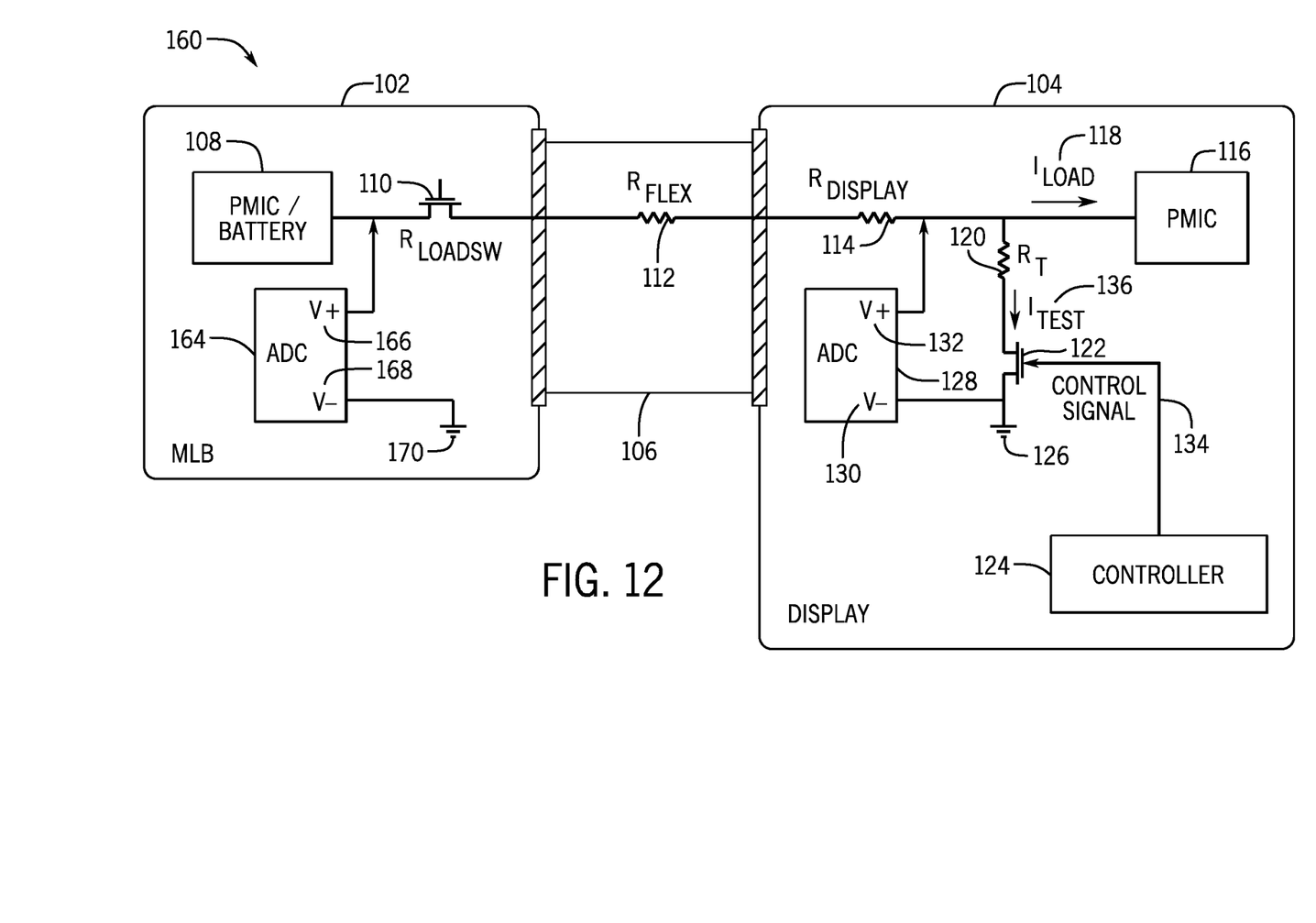
FIG. 12 is a block diagram of another system for measuring power consumed by an electronic display, in accordance with an embodiment.

FIG. 12 shows another example of circuitry for in-system power measurement via a fourth electronic display circuit 160. The electronic display circuit 160 includes the analog-to-digital converter 128 and a second analog-to-digital converter 164. The analog-to-digital converter 128 connects the negative input terminal 130 to the reference ground voltage 126 and the positive input terminal 132 to the node connecting the display internal resistance 114 to the second PMIC 116. The second analog-to-digital converter 164 connects a second negative input terminal 168 to a second reference ground voltage 170 and a second positive input terminal 166 to the node connecting the first PMIC/battery 108 to the load switch 110. The combination of the two analog-to-digital converters makes an effective voltage difference measurement.

Additionally or alternatively, a single analog-to-digital converter 128 may be used to make power usage calculations for different loads. For example, the circuit 50 may be used to measure the power usage of multiple loads by switching device(s) that may switch which load is currently being measured. By way of example, one or more multiplexers may selectively route the power measurement circuitry to measure the power consumption of different loads on command. Using such switching device(s) may allow the positive input terminal 132 and the negative input terminal 130 of the voltage difference measurement device 62 to transition between measuring loads, and may be controlled by the controller 124 or other circuitry of the electronic device 10.

Because the voltage difference measurement device 62 to measure voltages outside the measurement range of the voltage difference measurement device 62 may lead to unreliable and incorrect power calculations, an additional component, designed to increase the input voltage 58 and the load voltage 60 measured into a more appropriate range (e.g., differential amplifier) for the voltage difference measurement device 62, may be added in series with the positive and negative terminals of the voltage difference measurement device 62 at the node of measurement if desired. Furthermore, any of the examples discussed above may be used to measure power consumption by another electronic component of the electronic device 10, and it should be appreciated that an electronic display is provided by way of example.

Thus, the technical effects of the present disclosure include a method for measuring the power usage of one or more target loads. This may be performed without introducing additional unwanted resistances into the circuits by leveraging other resistances (e.g., parasitic resistances) to calculate power usage through use of a current source and a voltage difference measurement device.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
a power supply;
an electronic display configured to be supplied with power by the power supply via at least one conductor between an electronic display power source input in the electronic display and the power supply, wherein the at least one conductor has a first resistance;
a selectively activatable current source coupled to the at least one conductor, wherein the selectively activatable current source is configured to cause an amount of current flowing across the first resistance of the at least one conductor to change by a first current difference when the selectively activatable current source is activated; and
voltage measurement circuitry configured to measure a digital value of a first voltage difference across the first resistance while the selectively activatable current source is activated and to measure a digital value of a second voltage difference across the first resistance while the selectively activatable current source is not activated, thereby enabling a calculation of power consumption by the electronic display based at least in part on the digital value of the first voltage difference, the digital value of the second voltage difference, and a digital value of the first current difference.

2. The electronic device of claim 1, wherein the selectively activatable current source comprises a switch and a resistor coupled in series between the at least one conductor and a reference voltage.

3. The electronic device of claim 1, wherein the selectively activatable current source comprises a switch and a current mirror coupled in series between the at least one conductor and a reference voltage node.

4. The electronic device of claim 1, wherein the selectively activatable current source is coupled to the at least one conductor between a resistance and the electronic display power source input in the electronic display.

5. The electronic device of claim 1, wherein the first resistance comprises a parasitic resistance on the at least one conductor.

6. The electronic device of claim 1, wherein the power supply is disposed on a logic board coupled to the electronic display via a flexible cable and wherein the first resistance comprises a flex resistance of the flexible cable.

7. The electronic device of claim 1, wherein the power supply is disposed on a logic board that includes a power transistor configured to selectively provide the power to the electronic display, wherein the first resistance comprises a switching resistance of the power transistor.

8. The electronic device of claim 1, wherein the first resistance comprises a ferrite resistance on the electronic display.

9. The electronic device of claim 1, wherein the first resistance is configured to vary depending on a current operating condition of the electronic device.

10. The electronic device of claim 9, wherein the current operating condition comprises a temperature of the at least one conductor.

11. The electronic device of claim 1, comprising routing circuitry configured to cause the selectively activatable current source to couple to a different at least one conductor that is disposed between the power supply and a second power-consuming component of the electronic device, wherein the different at least one conductor has a second resistance, wherein the routing circuitry is configured to cause the voltage measurement circuitry to couple to the different at least one conductor to measure a digital value of a different first voltage difference across the second resistance while the selectively activatable current source is activated and to measure a digital value of a different second voltage difference across the second resistance while the selectively activatable current source is not activated, thereby enabling a calculation of power consumption by the second power-consuming component of the electronic device based at least in part on the digital value of the different first voltage difference, the digital value of the different second voltage difference, and a digital value of a different current difference that is applied to the different at least one conductor when the selectively activatable current source is activated.

12. A method comprising:
supplying electrical power from a power supply of an electronic device to a power-consuming component of the electronic device over at least a first resistance;
measuring a digital value of a first voltage over the first resistance;
activating a current source, wherein activating the current source causes an amount of current flowing across the first resistance to change by a first amount of current and therefore causes the first voltage over the first resistance to change to a second voltage over the first resistance;
measuring a digital value of the second voltage over the first resistance; and
calculating power consumption by the power-consuming component of the electronic device using data processing circuitry in the electronic device based at least in part on the digital value of the first voltage, the digital value of the second voltage, and a digital value of the first amount of current.

13. The method of claim 12, comprising determining the digital value of the first amount of current at least in part by calculating an amount of current flowing through the current source when the current source is activated.

14. The method of claim 13, wherein the amount of current flowing through the current source when the current source is activated is calculated by determining a voltage difference over the current source and dividing the voltage difference over the current source by a known resistance value of a resistor of the current source.

15. The method of claim 12, comprising determining the digital value of the first amount of current at least in part by accessing from a memory a digital value of an electrical current drawn by a current mirror of the current source.

16. The method of claim 12, wherein the digital value of the first voltage and the digital value of the second voltage are measured by a first analog-to-digital converter configured to measure the digital value of the first voltage and the digital value of the second voltage.

17. The method of claim 12, wherein the digital value of the first voltage is measured at least in part by:
measuring a first digital value using a first analog-to-digital converter;
measuring a second digital value using a second analog-to-digital converter; and
calculating a difference between the first digital value and the second digital value to obtain the digital value of the first voltage.

18. The method of claim 12, wherein the power consumption by the power-consuming component of the electronic device is calculated at least in part by:
determining the digital value of the first amount of current;
calculating a value of the first resistance by taking a difference between the first voltage and the second voltage to obtain a voltage difference and dividing the voltage difference by the first amount of current;
calculating a component current value flowing into the power-consuming component of the electronic device by dividing the first voltage by the value of the first resistance; and
calculating the power consumption based at least in part on the component current value and the first voltage.

19. An article of manufacture comprising one or more tangible, non-transitory, machine-readable media comprising instructions to:
measure a digital value of a first voltage over a first resistance occurring between a power supply of an electronic device and power-consuming component of the electronic device;
cause an amount of current flowing across the first resistance to change by a defined or calculable first amount of current and therefore cause the first voltage over the first resistance to change to a second voltage over the first resistance;
measure a digital value of the second voltage over the first resistance; and
calculate power consumption by the power-consuming component of the electronic device based at least in part on the digital value of the first voltage, the digital value of the second voltage, and a digital value of the first amount of current.

20. The article of manufacture of claim 19, wherein the instructions to cause the amount of current flowing across the first resistance to change by the defined or calculable first amount of current comprises instructions to issue a control signal to a switch that, when activated, closes a circuit between an input of the power-consuming component of the electronic device and a reference voltage node to add or subtract the defined or calculable first amount of current.

21. The article of manufacture of claim 19, wherein the instructions to measure the first voltage over the first resistance comprise instructions to measure the first voltage between an initial voltage output by the power supply and a load voltage at an input of the power-consuming component of the electronic device.

\* \* \* \* \*